United States Patent
Sundareson et al.

(10) Patent No.: US 9,672,586 B2
(45) Date of Patent: Jun. 6, 2017

(54) IMAGE SYNTHESIS METHOD WITH DSP AND GPU

(71) Applicant: Texas Instruments Incorporated, Dallas, TX (US)

(72) Inventors: Prabindh Sundareson, Karnataka (IN); Anand Balagopalakrishnan, Karnataka (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 14/920,328

(22) Filed: Oct. 22, 2015

(65) Prior Publication Data
US 2017/0116703 A1   Apr. 27, 2017

(51) Int. Cl.
| | |
|---|---|
| *G06T 3/00* | (2006.01) |
| *G06T 1/20* | (2006.01) |
| *G06T 5/00* | (2006.01) |
| *H04N 7/18* | (2006.01) |
| *G06T 17/20* | (2006.01) |

(Continued)

(52) U.S. Cl.
CPC .............. *G06T 3/0018* (2013.01); *B60R 1/00* (2013.01); *G06T 1/20* (2013.01); *G06T 5/006* (2013.01); *G06T 15/04* (2013.01); *G06T 15/503* (2013.01); *G06T 15/80* (2013.01); *G06T 17/20* (2013.01); *H04N 5/2628* (2013.01); *H04N 7/181* (2013.01); *B60R 2300/105* (2013.01); *B60R 2300/304* (2013.01); *B60R 2300/607* (2013.01)

(58) Field of Classification Search
CPC ....... G06K 2009/2045; G06K 9/00791; G06K 9/00805; H04N 5/23238; H04N 2101/00; H04N 5/3415; H04N 5/23229; H04N 13/0242; G06T 3/4038; G06T 5/006; G06T 2207/20221; G06T 3/0018; G03B 37/00; B60R 2300/105; B60R 2300/303; B60R 2300/60
See application file for complete search history.

(56) References Cited

U.S. PATENT DOCUMENTS

| | | | |
|---|---|---|---|
| 2006/0029255 A1* | 2/2006 | Ozaki | B60R 1/00 382/104 |
| 2010/0002071 A1* | 1/2010 | Ahiska | H04N 5/217 348/36 |

(Continued)

OTHER PUBLICATIONS

Yu, M. and Ma, G., 360° Surround View System with Parking Guidance, SAE Int. J. Commer. Veh. 7(1):2014, doi:10.4271/2014-01-0157, published Apr. 1, 2014, 6 pages.*

*Primary Examiner* — Haixia Du
(74) *Attorney, Agent, or Firm* — Robert D. Marshall, Jr.; Charles A. Brill; Frank D. Cimino

(57) ABSTRACT

This patent application focuses on partitioning the computation to perform the image processing on the DSP, communicate the results to the GPU in an optimized manner, and use the GPU to render 3D information to the display. This invention solves the problem of seamlessly merging live streams from plural automotive cameras into a 3D display that can be rotated to see different view points. This purpose is achieved by partitioning the computation task between a digital signal processor (DSP) for image processing and a graphics processing unit (GPU) for rendering and display. This invention also includes meta data structures for communication of results from the DSP to the GPU.

3 Claims, 4 Drawing Sheets

(51) Int. Cl.
   *G06T 15/04* (2011.01)
   *G06T 15/50* (2011.01)
   *G06T 15/80* (2011.01)
   *H04N 5/262* (2006.01)
   *B60R 1/00* (2006.01)

(56) References Cited

U.S. PATENT DOCUMENTS

| | | | |
|---|---|---|---|
| 2010/0097443 A1* | 4/2010 | Lablans | G03B 37/00 348/36 |
| 2015/0116451 A1* | 4/2015 | Xu | H04N 7/15 348/14.13 |

\* cited by examiner

IMAGE SYNTHESIS METHOD WITH DSP AND GPU

TECHNICAL FIELD OF THE INVENTION

The technical field of this invention is machine vision systems.

BACKGROUND OF THE INVENTION

Park-assist systems have been traditionally used in automobiles to provide an audible cue to the driver to indicate when an object is near the automobile. With an increase of computing power available on the chipsets that control the information display and graphics, it is now becoming possible to generate a visual image that shows the external environment of the car directly on the display, along with any additional information like overlays or auditory cues.

SUMMARY OF THE INVENTION

This patent application focuses on partitioning the computation to perform the image processing on the DSP, communicate the results to the GPU in an optimized manner, and use the GPU to render 3D information to the display.

This invention solves the problem of seamlessly merging live streams from plural automotive cameras into a 3D object that can be transformed in a GPU such as rotation to see different view points before displaying to a screen. This purpose is achieved by partitioning the computation task between a digital signal processor (DSP) for image processing and a graphics processing unit (GPU) for rendering and display. This invention also includes meta data structures for communication of results from the DSP to the GPU.

BRIEF DESCRIPTION OF THE DRAWINGS

These and other aspects of this invention are illustrated in the drawings, in which.

DETAILED DESCRIPTION OF PREFERRED EMBODIMENTS

Park-assist systems have been traditionally used in automobiles for providing an audible cue to the driver and indicate when an object is near to the automobile. With an increase of available computing power, it is now becoming possible to generate a visual image that shows the external environment of the car directly on the display with additional information like overlays or auditory cues. This amount of computing power may be provided by a chipset including a digital signal processor (DSP), a graphics processing unit (GPU) and a general purpose central processing unit (CPU). This combination provides sufficient, targeted processing for image processing and rendering.

This invention is directed to the problem of partitioning this computation and image synthesis on a combination of a DSP and a GPU. In this invention the image processing is mainly handled by the DSP and the rendering/display is mainly handled by the GPU. Optimal meta data structures are used for communication of results from the DSP to the GPU. This meta data provides an efficient data structure for passing the output of DSP computation to the next rendering stage by GPU. The goal of this invention is to seamlessly merge live video stream from multiple independent automotive cameras and display the merged streams on a 3D surface that can then be rotated by the driver of the vehicle to see different viewpoints.

Figure 1:
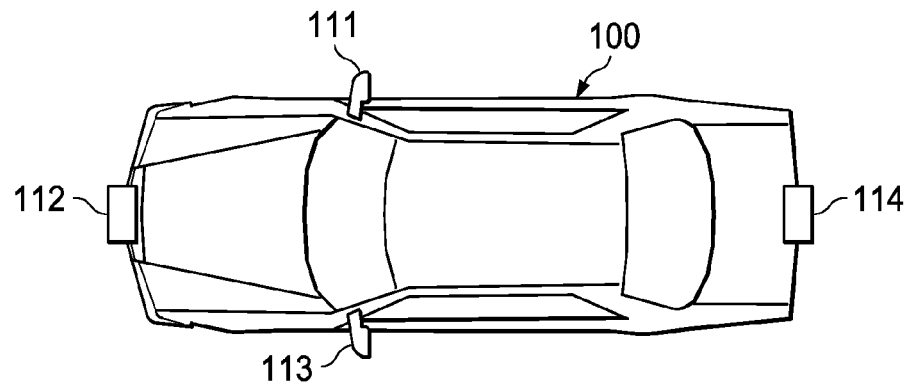
FIG. 1 illustrates the relationship between an automobile and the plural cameras that can be used with this invention.

FIG. 1 illustrates an exemplary combination of automobile and cameras. Automobile 100 includes four cameras; right camera 111; front camera 112; left camera 113; and rear camera 114. Right camera 111 and left camera 113 are mounted on the respective outside rear view mirrors (ORVM). Front camera 112 is mounted below the hood opening. Rear camera 114 is mounted below the trunk opening. The visual park assist system in an automobile typically consists of four or more cameras (such as illustrated in FIG. 1) that give the driver a visual view of the surroundings. The four cameras typically have wide-angle, fish-eye lens resulting in overlapping Fields of View (FOV). The four or more images can be shown independently on a screen allowing the driver to switch to an individual camera feed based on a physical knob or button. In an advanced implementation, an optical stitch of the plural images provides a continuous view of the surroundings in one single output image. This image can then be shown on the driver's screen in the automobile. The advantage of a single image is that it provides a full view of the surroundings in a single display, without needing the driver to switch to individual views manually. In order to assure that the combined image are correctly assembled, each camera video is time-stamped for time synchronization.

The steps to stitch the individual images together that precede the final rendering are: calibration of image capture; image dewarping (fish eye lens distortion correction); lighting analysis (photometric alignment); and image fitting (geometric alignment). Because the four cameras 111, 112, 113 and 114 are mounted in relative fixed relation to each other, these calibration computations are typically performed once at production and repeated at reasonable intervals to take care of mis-alignment during usage. Such mis-alignment could occur due to accidental deformations of the mounting. These algorithms can be efficiently implemented on a programmable accelerator like a DSP. Once the calculations are performed, a 3D accelerator can be used to synthesize the images and render the outputs, using the available information from the DSP. This flow is shown in FIGS. 2 and 3 below.

Figure 2:
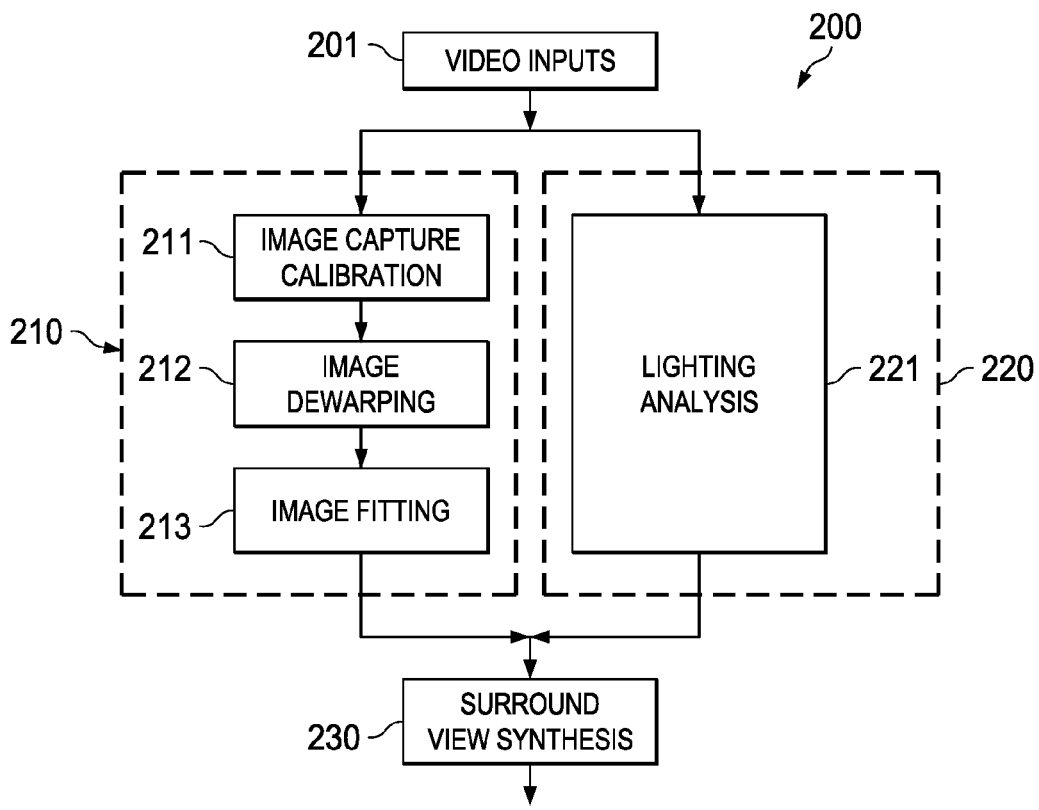
FIG. 2 is a flow chart of the major processes of the digital signal processor of this invention.

FIG. 2 is a flow chart of the process 200 performed by the DSP in this invention. Process 200 begins with the video inputs 201 from cameras 111, 112, 113 and 114. These inputs branch to two processes: geometric correction parameters 210; and photometric correction parameters 220. Geometric correction parameters 210 include image capture calibration 211, image dewarping 212 and image fitting 213. Photometric correction parameters 220 includes lighting analysis 221. Data from geometric correction parameters 210; and photometric correction parameters 220 feed surround view synthesis 230. Surround view synthesis 230 takes the meta data for modifying the video inputs and forms a 3D synthetic view for display.

Figure 3:
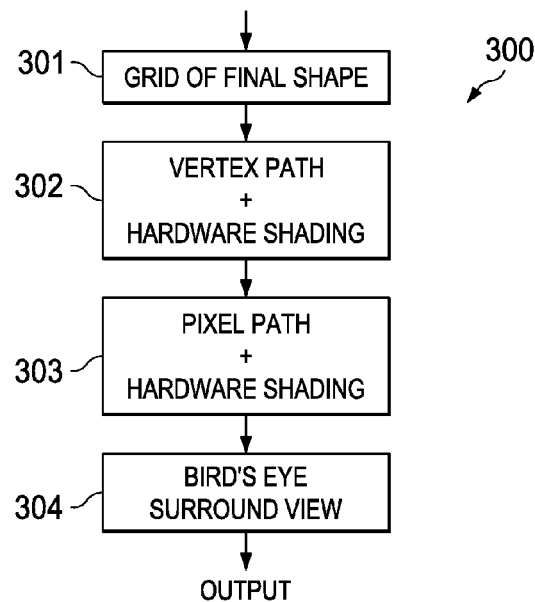
FIG. 3 is a flow chart of the major processes of the graphics processor unit of this invention.

FIG. 3 is a flow chart of process 300 performed by the GPU. Process 300 receives the 3D synthetic view from the DSP and produces signals for driving the display. Process 300 begins with grid of the final shape 301. Vertex path 302 receives inputs including GL uniforms, the grid of the final shape 301 as GL attributes, and video inputs as textures. Vertex path 302 computes the color of each of the vertex points by blending values form adjacent camera views and adjusting for lighting conditions as computed by the DSP. Pixel path 303 computes the color for each pixel in the screen. Birds eye surround view 304 is suitable for display to the driver.

Figure 4:
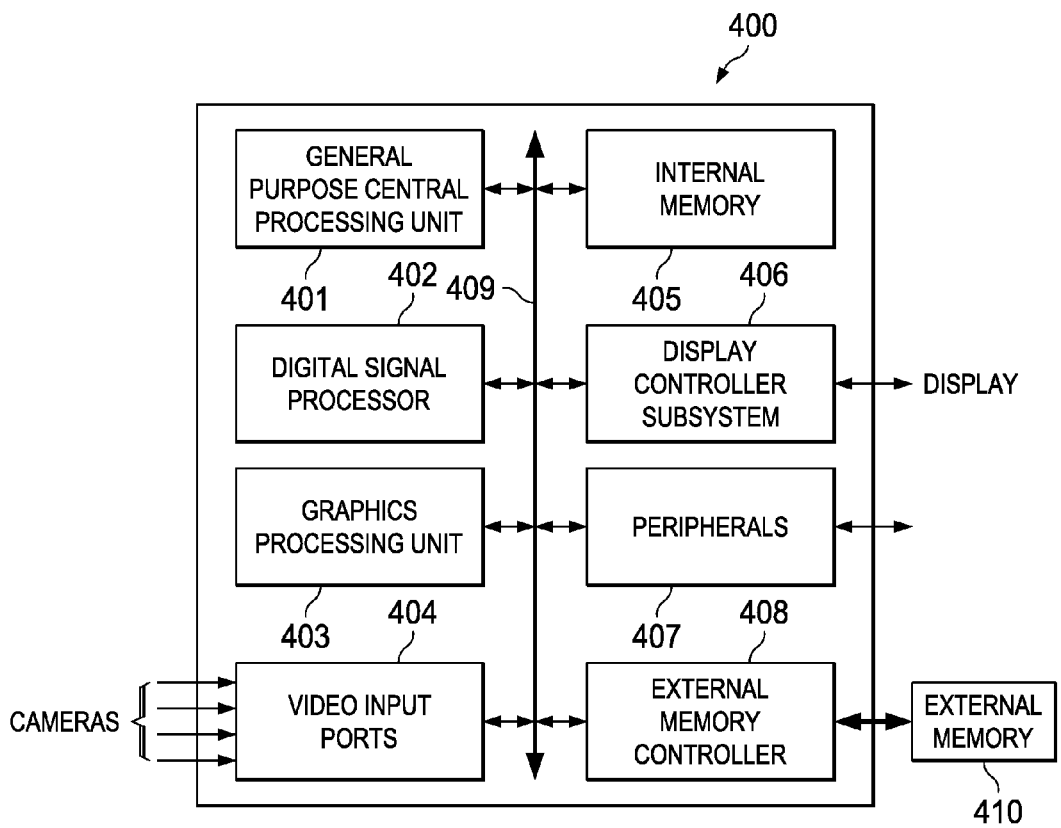
FIG. 4 illustrates an example system-on-chip (SOC) 400 suitable for this invention.

FIG. 4 illustrates an example system-on-chip (SOC) 400 suitable for this invention. SOC 400 includes general purpose central processing unit (CPU) 401, digital signal processor (DSP) 402, graphics processing unit (GPU) 403, video input ports 404, internal memory 405, display controller subsystem 406, peripherals 407 and external memory controller 408. In this example, all these parts are bidirectionally connected to a system bus 409. General purpose central processing unit 401 typically executes what is called control code. Control code is what gives SOC 400 its essential character generally in the way it interacts with the user. Thus CPU 401 controls how SOC 400 responds to user inputs (typically received via peripherals 407). DSP 402 typically operates to process images and real-time data. These processes are typically known as filtering. The processes 210 and 220 shown in FIG. 2 are performed by DSP 402. GPU 403 performs image synthesis 230 and display oriented operations used for manipulation of the data to be displayed. Video input ports 404 receive the input images from cameras 111, 112, 113 and 114. Video input ports 404 typically also includes suitable buffering of the image data prior to processing. Internal memory 405 stores data used by other units and may be used to pass data between units. The existence of memory 405 on SOC 400 does not preclude the possibility that CPU 401, DSP 402 and GPU 403 may include instruction and data cache. Display controller subsystem 406 generates the signals necessary to drive the external display used by the system. Peripherals 407 may include various parts such as a direct memory access controller, power control logic, programmable timers and external communication ports for exchange of data with external systems (as illustrated schematically in FIG. 4). External memory controller 408 controls data movement into and out of external memory 410.

Figure 5:
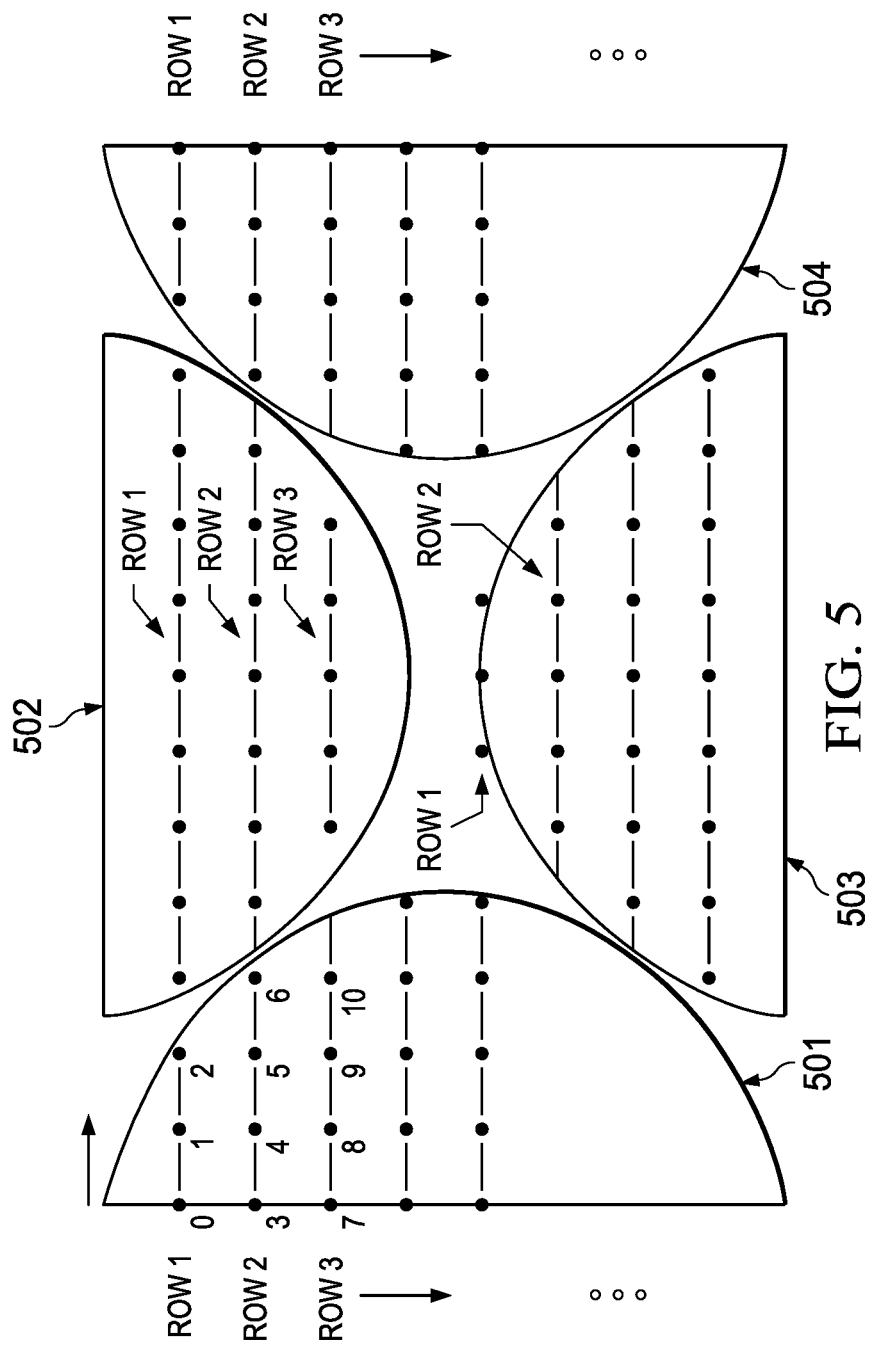
FIG. 5 illustrates a mapping combining four camera images to generate a final single image.

The preferred embodiment of this invention combines four camera images to generate a final single image. Once image calibration and aligned stitching is done, the aligned single image is displayed on a screen. The output of the stitching process is a mapping of the pixel locations in the final image to a pixel location in one of the input images. FIG. 5 illustrates this mapping in a simple manner. Each of four panes 501, 502, 503 and 504 is represented as a separate grid of points.

While it is simple to think of the mapping as 1:1, with each pane mapping an input image for rendering on the GPU, this does not represent the image processing functionality performed by the DSP (geometric alignment, dewarping, other alignment including color) and the GPU. The prior art methods of texture mapping on the GPU would involve one of two methods: creating four different meshes, one for each camera image, where each mesh maps a single image; and creating a single texture image for the entire screen, creating a texture atlas image that is a single image formed from all four camera images that are placed contiguous in memory. Neither of these methods provide for high performance. In the first method, the whole screen cannot be drawn in a single GPU draw call. This increases the overhead and processing latency. The second method has a significant bandwidth bottleneck because the CPU or other 2D engine has to move four full-camera images (each having more than 1280×720 pixels) to form a new contiguous image, for each frame of composition at 30 frames per second (fps). In high end systems the composition rate can go up to 60 frames per second (fps).

In this invention, the DSP performs the image processing and alignment, and generates a mapping for each output pixel on the screen back to one of input images or a combination of input images. This is true for a particular shape of the ground plane, such as flat or salad bowl.

For each of the quadrants and the overlapping regions, the DSP computes a mapping to one of the input images. This invention provides a mechanism for efficiently conveying this information to the GPU. This is called the surround-view generator, which operates as follows on a per-pixel basis:

$$\text{Output pixel}(x,y) = \text{Pixel}(x1, y1, \text{image}_{ID})$$

Thus each output pixel is mapped to an input pixel of one of the input images. Alternatively the quality of the output image can be improves by generating the final image as a combination of pixels from multiple input images in the overlapping regions as follows:

$$\text{Output pixel}(x,y) = \text{function}(\text{Pixel1}, \text{Pixel2}), \text{ where}$$

Pixel1=Pixel (x1, y1, $\text{image}_{ID1}$) and
Pixel2=Pixel (x2, y2, $\text{image}_{ID2}$)

Quality may be further improved by doing the photometric alignment between the images before reaching the GPU. This provides lighting that is uniform across the pixels of the final image.

Once the mapping is generated for a particular ground plane shape, these pixels are accessed to generate the final image. These accesses require a combination of data fetches from multiple memory locations corresponding to each of these images then generating a perspective of the ground plane mesh (flat, or salad bowl). The ground plane can be a true 2D mesh, or it can be a 3D mesh with x, y and z values. In this invention the output of the DSP consists of a set of mappings from the output image to a combination of the input images.

To render a 3D object like the ground plane or mesh of this invention, the GPU needs at least two types of data: vertex coordinates that define the 3D mesh (Vertices); and texture coordinates for each of the vertices that define where the image data (texture) is stored (Attributes). If the meshes for each image are drawn separately, then the same shader can be used for all images. This requires significant pre-processing to be done to separate the meshes into four parts. This invention uses a concept called multi-texturing. Four hardware texture units in the GPU are used together. Each image source is assigned to one hardware texture unit. These are accessed depending on the information provided by the DSP using conditional checks. This invention consumes the input camera images during vertex processing stage. This is counter-intuitive. In the prior art, the coloring or texture upload typically happens in the second stage of GPU pipeline known as fragment processing.

Figure 6:
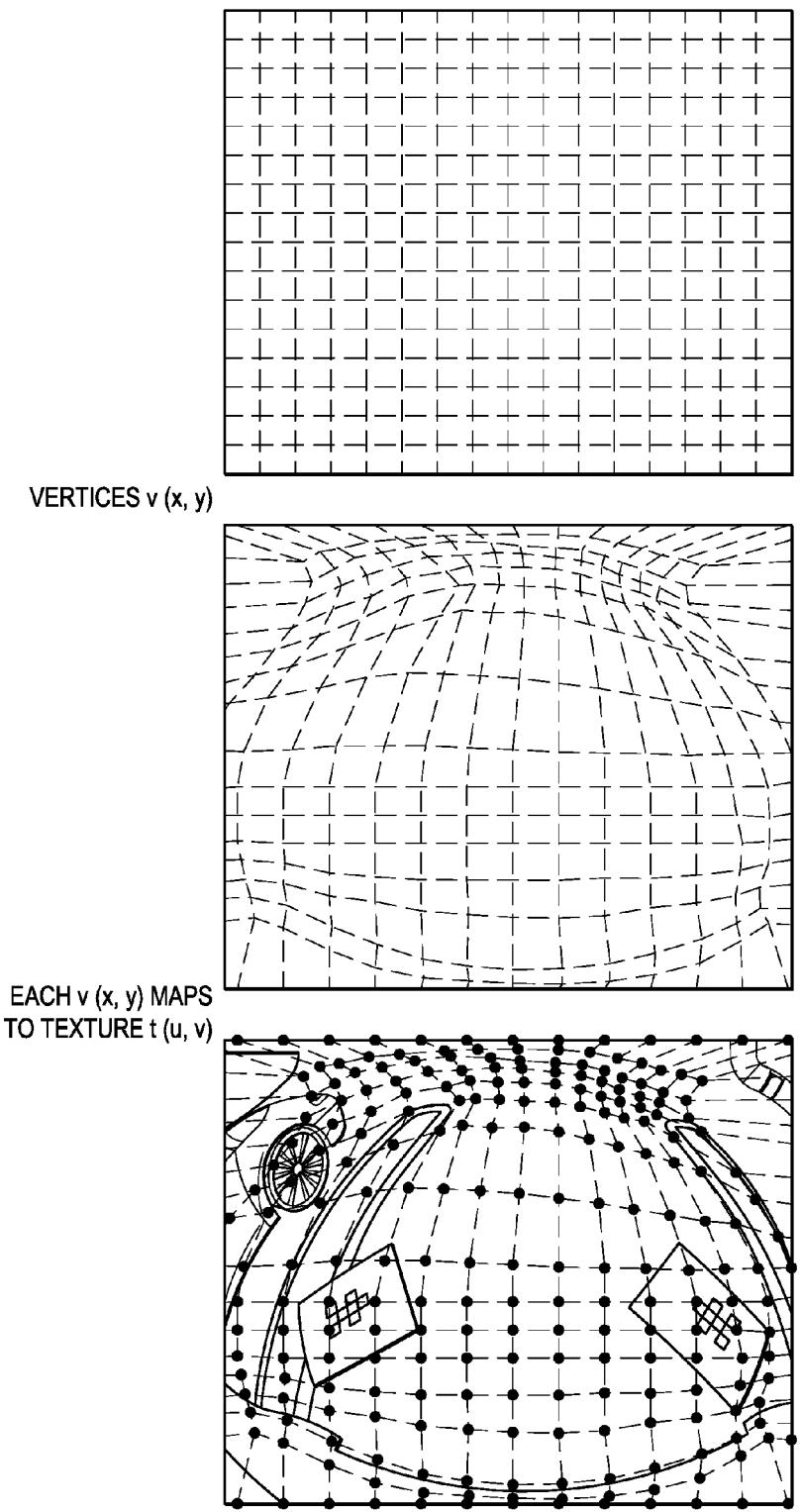
FIG. 6 illustrates the 3D rendering flow of this invention.

FIG. 6 illustrates the 3D rendering flow of this invention. Vertices v(x,y) are transformed via textures t(u,v) for each v(x,y). View 603 illustrates an example transformed image.

This invention transmits data from the DSP into the GPU via an efficient mapping and data-structure. This data structure is defined to reflect the mapping in the description of stitching. This data structure is called an index buffer.

This index buffer pertains to a mapping per-pixel for the whole buffer. This per-pixel data structure is output from the DSP, covering the whole screen. The format of this is defined as below:

```
typedef struct _gridpoint
{
    short x;                      /1. X coordinate, signed 16bit
    short y;                      /2. Y coordinate, signed 16bit
    q12_4_t z;                    /3. Z coordinate (Q12.4
                                      format)
    unsigned short texelY;        /4. Input image gridpoint
                                      location vertical
    unsigned short texelX;        /5. Input image gridpoint
                                      location horizontal
    unsigned short imageindex;    /6. Input image index (i.e 1
                                      through 4)
}gridpoint;
```

This data-structure provides only for the mapping. This invention defines 2 additional derived index-buffer types. This provides a blending factor that combines multiple images to generate the new pixel at the output and provides a color adjustment factor to do photometric alignment. The format of this is defined as below:

```
typedef struct _gridpoint
{
    short x;                      /1. X coordinate, signed 16bit
    short y;                      /2. Y coordinate, signed 16bit
    q12_4_t z;                    /3. Z coordinate (Q12.4
                                      format)
    unsigned short texelY;        /4. Input image gridpoint
                                      location vertical
    unsigned short texelX;        /5. Input image gridpoint
                                      location horizontal
    unsigned short imageindex1;   /6. Input image index for
                                      blend layer1 (i.e 1
                                      - 4)
    unsigned char alpha1;         / Alpha for layer 1
    unsigned short imageindex2;   /6. Input image index for
                                      blend layer2 (i.e 1
                                      - 4)
    unsigned char alpha2;         / Alpha for layer 2 (including
                                      priority)
    unsigned char coloradjust;    / Color adjustment factor
}gridpoint;
```

In order to pass the per-pixel information to the GPU efficiently, these are passed as attributes using a procedure calls. An offline tool converts the above per-pixel information to an attribute array having an index array, texture coordinates and image ID for a given mesh and camera viewpoint.

To efficiently render a 3D object that might contain multiple overlapping vertices to draw a shape, the application should upload only the minimal required mesh to the GPU and provide only references to the already uploaded vertices instead of re-uploading. This is called the indexed mode of rendering.

Practical implementations require the number of vertex indices to be under 64 k vertices per mesh when using indexed vertex rendering. An offline tool sub-samples the mesh from the DSP to generate a mesh that satisfies this constraint. This is advantageous in two ways. The GPU typically has the capability to interpolate the values of every attribute that is passed on per vertex depending on the location of the corresponding pixel on the screen and the distance to the nearest grid point in the mesh. The quality of the filtering can be specified by using procedure calls, thus retaining control over the final image quality and providing scalable performance. A shader selects the right image based on the image index passed to the GPU per vertex.

Partitioning the computation and rendering between the DSP and the GPU allows scalable quality of rendering relative to the GPU and DSP computational needs. The mesh count is the number of vertex co-ordinates (vertices) defining the 3D mesh. The mesh count has a direct bearing on the computational complexity and rendering quality. Increasing the number of vertices will increase the rendering quality but will also require higher computational cycles. Hence, a scalable quality of rendering may be achieved by varying the mesh count used for GPU rendering and employing hardware filtering on the GPU in the display path.

In the prior art 2D surround view, the computation and rendering is handled on the DSP. The rendering alone consumes about 65% of the DSP computational. Offloading the rendering to the GPU frees the DSP computational bandwidth for other algorithms such as RADAR processing orLiDAR processing.

Rendering through the GPU provides ability to transform the 3D surface (rotation/movement/etc.) within the GPU without extra computational burden. This is a major value addition allowing the driver to view the surroundings from different perspectives without moving the cameras or automobile.

What is claimed is:

1. A method of data processing comprising steps of:
   receiving a video image feed from each of a plurality of cameras having differing views of a scene;
   dewarping each video image feed from a corresponding received video image to a predetermined display surface;
   adjusting lighting of each dewarped video image to a uniform lighting level;
   wherein said steps of receiving, dewarping, adjusting and synthesizing are performed via a digital signal processor;
   synthesizing a combined image from the lighting adjusted video images into a single combined video image;
   vertex processing;
   pixel processing;
   blending;
   forming a birds eye surround view;
   said steps of vertex processing, pixel processing, blending, shading and color conversion, and forming a birds eye surround view are performed on a graphics processing unit; and
   further comprising a step of forming an index buffer data structure to transmit data from the digital signal processor to the graphics processing unit mapping per-pixel for the whole buffer as defined below:

```
typedef struct _gridpoint
{
    short x;                      /1. X coordinate, signed 16bit
    short y;                      /2. Y coordinate, signed 16bit
    q12_4_t z;                    /3. Z coordinate (Q12.4
                                      format)
    unsigned short texelY;        /4. Input image gridpoint
                                      location vertical
    unsigned short texelX;        /5. Input image gridpoint
                                      location horizontal
    unsigned short imageindex1;   /6. Input image index for
                                      blend layer1 (i.e 1
                                      - 4)
```

```
    unsigned char alpha1;        / Alpha for layer 1
    unsigned short imageindex2;/6. Input image index for
                                        blend layer2 (i.e 1
                                        - 4)
    unsigned char alpha2;        / Alpha for layer 2 (including
                                        priority)
    unsigned char coloradjust;   / Color adjustment factor
}gridpoint.
```

2. The method of claim 1, wherein:

said steps of receiving, dewarping, adjusting and synthesizing performed via a digital signal processor and said steps of vertex processing, pixel processing, blending, and forming a birds eye surround view on a graphics processing unit are controlled by varying a mesh count depending on digital signal processor and graphics processing unit computational capacities.

3. The method of claim 1, further comprising:

generating attribute arrays from per-pixel information having an index array, texture coordinates and image ID for a given camera view point and mesh.

\* \* \* \* \*